United States Patent [19]

Melby et al.

[11] Patent Number: 4,511,699
[45] Date of Patent: Apr. 16, 1985

[54] FLEXIBLE THERMOPLASTIC VINYL CHLORIDE POLYMERS AND ACRYLATE TERPOLYMERS

[75] Inventors: Earl G. Melby, Uniontown; Hubert J. Fabris; Russell A. Livigni, both of Akron; Harry W. Cocain, Cuyahoga Falls, all of Ohio

[73] Assignee: The General Tire & Rubber Company, Akron, Ohio

[21] Appl. No.: 570,730

[22] Filed: Jan. 13, 1984

Related U.S. Application Data

[62] Division of Ser. No. 390,109, Jun. 21, 1982, Pat. No. 4,480,076.

[51] Int. Cl.$^3$ .................... C08F 20/28; C08F 20/26; C08F 20/18; C08L 27/06
[52] U.S. Cl. .................... 525/205; 525/206; 525/230; 526/264; 526/270; 526/329.3; 526/258; 526/262
[58] Field of Search .................. 526/329.3, 270, 258, 526/264; 525/205, 206

[56] References Cited

U.S. PATENT DOCUMENTS

| | | | |
|---|---|---|---|
| 2,425,191 | 8/1947 | Kropa | 526/329.3 |
| 2,486,241 | 10/1949 | Arnold | 526/329.3 |
| 3,265,768 | 8/1966 | Mottus et al. | 260/885 |
| 3,673,283 | 6/1972 | Tanaka et al. | 525/230 |
| 4,027,090 | 5/1977 | Giddings et al. | 526/329.3 |

OTHER PUBLICATIONS

Piglowski et al., Die Angewandte Macromolekulare Chemie 88, pp. 165–178 (1980).

*Primary Examiner*—Carman J. Seccuro

[57] ABSTRACT

Flexible thermoplastic vinyl chloride polymers are prepared by graft or over copolymerizing said polymers with a mixture of certain acrylates and nitriles or by blending said vinyl chloride polymer with a terpolymer of certain acrylates and nitriles.

14 Claims, No Drawings

FLEXIBLE THERMOPLASTIC VINYL CHLORIDE POLYMERS AND ACRYLATE TERPOLYMERS

This is a divisional of application Ser. No. 390,109 filed June 21, 1982, now U.S. Pat. No. 4,480,076.

The present invention relates to the preparation of flexible thermoplastic vinyl chloride polymers by graft or over copolymerization or by blending.

BACKGROUND OF THE INVENTION

Highly plasticized poly(vinyl chloride) composites are used in numerous unsupported film applications and coated fabrics. Most commonly used plasticizers volatilize with time resulting in embrittlement and cracking of poly(vinyl chloride) composites. Condensation of the plasticizer also causes fogging of automobile windshields.

Polymers that can be blended with poly(vinyl chloride), PVC, to form flexible products are, therefore, desired. Miscible polymer blends are considered to be exceptionally rare because of unfavorable thermodynamics of polymer mixing. Nevertheless, there are a few examples of polymers that are known to form miscible blends with poly(vinyl chloride). Unfortunately many of these polymers are either difficult to blend with PVC, crystallize on standing to harden the PVC blend or can only be added to the PVC in limited amounts. ("Polymer Blends," Vol. 2 Paul and Newman, Academic Press, Inc., New York, 1978, article by C. F. Hammer, pages 219-242.)

Grafting is one way of improving compatibility between two immiscible polymers. Preparation of graft copolymers of poly(vinyl chloride) using free-radical polymerization techniques is inefficient in that only low amounts of the grafting monomers become chemically attached as grafted polymer to the poly(vinyl chloride) backbone. Compositions resulting from these grafting reactions contain large amounts of ungrafted polymers which are usually incompatible with poly(vinyl chloride). Consequently, the materials have poor physical, optical and processing properties.

Copending U.S. patent application Ser. No. 414,090 filed Sept. 1, 1982 now U.S. Pat. No. 4,423,193 granted Dec. 27, 1983, a continuation of U.S. patent application Ser. No. 287,462 filed July 27, 1981, abandoned, describes a technique for obtaining much higher grafting efficiencies and compatible compositions by grafting acrylic and other unsaturated copolymerizable monomers to partially dehydrochlorinated poly(vinyl chloride) which contains graft sites (polyene sequences). However, in the present invention it is not necessary to use partially dehydrochlorinated poly(vinyl chloride) to prepare the desired flexible compositions.

OBJECTS

An object of this invention is to avoid the difficulties alluded to before and to provide novel processes for the preparation of flexible thermoplastic vinyl chloride polymers or resins.

Another object of this invention is to provide new polymers for blending with vinyl chloride polymers or resins.

A further object is to provide new flexible thermoplastic vinyl chloride polymers or resins.

These and other objects and advantages of the present invention will become more apparent to those skilled in the art from the following detailed description and working examples.

SUMMARY OF THE INVENTION

This invention describes a terpolymer composition that is compatible with poly(vinyl chloride). The terpolymer composition comprises certain acrylates and nitriles. The monomers that make up this terpolymer are graft copolymerized (using free radical techniques) in the presence of an aqueous dispersion of poly(vinyl chloride) which has been swollen with the monomers. Any unattached homopolymer (co or terpolymer) that results from inefficient grafting mixes with poly(vinyl chloride) and the graft copolymer to form a homogeneous blend with good physical properties. Thus, lower levels of grafting can be tolerated if the ungrafted homopolymer is sufficiently miscible with poly(vinyl chloride). The nitrile monomers also are useful for affording more compatibility with the PVC. Moreover, after suspension polymerization of the vinyl chloride monomer, the grafting monomers can be added to the same reactor with any additional catalyst and colloid required and suspension polymerization continued in the same reactor to make the graft copolymer. Alternatively, the terpolymer composition can be formed by free radical aqueous emulsion polymerization separately and then blended (melt blending) with poly(vinyl chloride) using mixing equipment (Brabender, two roll mill) to form homogeneous plasticized films and so forth. Other techniques for blending or mixing are also possible (solution blending). Mixtures of the graft copolymer and blended copolymers may be used.

Since these monomers result in polymer compositions usually with low glass transition temperatures, plasticized poly(vinyl chloride) compositions result. The compositions are useful in coated fabrics and flexible films and can be molded, calendered or extruded into various products such as in covers for arm rests, seats and chairs, upholstery, door panels and dashboards for automobiles and trucks and gaskets for refrigerators and so forth. For example, the maximum amount of copolymerized acrylonitrile in the graft copolymer compositions or blends of this invention is about 12% by weight which makes them desirable for use as upholstery materials which usually require films of a brittle point below 0° C. While the terpolymer per se is very useful for plasticizing vinyl chloride polymers, it, also, may be used as a plasticizer for other resins and as an impact modifier for acrylonitrile-butadiene-styrene (ABS) resins, as a low profile or low shrink additive for FRPs (glass fiber-polyester-styrene thermosets) and so forth.

DISCUSSION OF DETAILS AND PREFERRED EMBODIMENTS

1. The vinylchloride polymer or resin used in this invention is homopolyvinylchloride, vinylchloride-vinyl acetate copolymer containing up to about 50% by weight of vinyl acetate, and vinylchloride-vinylidene chloride copolymer containing up to about 50% by weight of vinylidene chloride and mixtures of the same, porous (preferred) or non-porous. These polymers are made by the suspension polymerization process. These suspension polymers are obtained as finely divided particles or solids. The preferred vinylchloride resin to use is homopoly(vinylchloride). 2. Monomers to make the terpolymer itself or the terpolymer graft:

A. The copolymerizable acrylate monomer used in forming the graft copolymer has the general formula

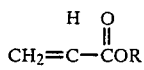

where R is an alkyl group of from 4 to 8 carbon atoms. Examples of such polymerizable monomers are n-butylacrylate (preferred), s-butyl acrylate, hexyl acrylate, octyl acrylate, 2-ethyl hexyl acrylate and the like. Mixtures of these acrylates can be used. Poly n-butyl acrylate has a glass transition temperature, Tg, of $-54°$ to $-56°$ C. These acrylates as homopolymers per se should have a Tg of not above about $-20°$ C.

B. The second copolymerizable monomer used is selected from the group consisting of methyl acrylate (preferred), ethyl acrylate, tetrahydrofurfuryl acrylate (also preferred) and tetrahydrofurfuryl methacrylate and mixtures thereof. The tetrahydrofurfuryl acrylate or tetrahydrofurfuryl methacrylate may be obtained by transesterification processes from tetrahydrofurfuryl alcohol and methyl acrylate or methyl methacrylate. Alternatively, acrylic acid or methacrylic acid or the acid chloride can be reacted with the tetrahydrofurfuryl alcohol.

C. The third copolymerizable monomer used is selected from the group consisting of acrylonitrile (preferred), methacrylonitrile (also preferred), N-vinyl-2-pyrrolidone (1-vinyl-2-pyrrolidone) and vinyl-alpha-methyl pyrrolidone and mixtures thereof.

The monomers of A, B and C above are used with respect to each other in the following amounts:
from about 24 to 94% by weight of A,
from about 1 to 75% by weight of B and
from about 1 to 20% by weight of C, all amounting finally to 100% by weight total.

The amount of monomer chosen from each group will depend on the specific monomer chosen and the end use that is desired.

The above monomeric mixture or terpolymer made from said monomeric mixture is used in an amount of from 60 to 40% by weight and the vinyl chloride polymer is used in an amount of from about 40 to 60% by weight.

The graft polymerization or co-polymerization is done by aqueous free radical suspension polymerization. Suspension polymerization provides a product which readily can be isolated or recovered by centrifugation or filtration and so forth.

The preparation of the terpolymer per se may be done by aqueous free radical emulsion polymerization or by solution polymerization. However, it is preferred to use emulsion polymerization since solution polymerization involves the use of expensive solvents and the need to recover and purify them.

Suspension polymerization or copolymerization is well known as shown by Schildknecht, "Vinyl and Related Polymers," 1952, John Wiley & Sons, Inc., New York. See, also, Whitby et al, "Synthetic Rubber," John Wiley and Sons, Inc., New York, 1954 and "Encyclopedia Of Polymer Science And Technology," Vol. 13, 1970, John Wiley & Sons, Inc., New York, pages 552-571.

The technique of polymerizing or copolymerizing one or more monomers in the presence of a polymer or a substrate, "grafting technique," is known and is frequently called graft polymerization or graft or over copolymerization. In this connection, please see "Preceedings Of The Third Rubber Technology Congress," 1954, W. Heffer & Sons, Ltd., Cambridge, pages 185-195; "Copolymerization," High Polymers, Vol. XVIII, Ham, Interscience Publishers a division of John Wiley & Sons, New York, 1964; "Block and Graft Polymers," Burlant and Hoffman, Reinhold Publishing Corporation, New York, 1960; "Block and Graft Copolymers," Ceresa, Butterworth & Co. (Publishers) Ltd., London, 1962; "Block and Graft Copolymerization," Ceresa, Vol. 1 (1973) and Vol. 2 (1976), John Wiley & Sons, Ltd., New York; "Graft Copolymers," Polymer Reviews, Vol. 16, Battaerd and Tregear, Interscience Publishers, a division of John Wiley & Sons, New York, N.Y., 1967; "Block and Graft Copolymers," Burke and Weiss, Syracuse University Press, Syracuse, N.Y., 1973; "Encyclopedia Of Polymer Science And Technology," Volume 2, 1965, John Wiley & Sons, Inc., New York, pages 485-528 and "Encyclopedia Of Polymer Science And Technology," Supplement Volume 2, 1977, John Wiley & Sons, Inc., New York, pages 129-158. See, also, U.S. Pat. Nos. 3,180,908 and 3,519,702.

Emulsion polymerization or copolymerization, also, is well known as shown by Whitby et al and Schildknecht, above. Moreover, please see the "Encyclopedia Of Polymer Science And Technology," Vol. 5, 1966, John Wiley & Sons, Inc., New York, pages 801-859 and "Encyclopedia Of Polymer Science And Technology," Supplement Vol. 1, 1976, John Wiley & Sons, Inc., New York, pages 238-259.

The polymerizations should be conducted in a closed reactor, such as a pressure reactor, fitted with a stirrer or other agitating means, heating and cooling means, with means to flush with or pump in an inert gas such as nitrogen, helium, argon, neon and the like in order to polymerize preferably under controlled, inert or non-reactive conditions, with means to charge the resin (if previously separated), monomers, water, initiators and so forth, venting means, and with means to recover the graft polymer and so forth. The reactor should be cleaned or flushed out between polymerization runs to remove traces of initiators, modifier, colloids, surfactants, residues and the like which might interfere with subsequent polymerizations. There should be sufficient agitation or stirring of the polymerization media to ensure thorough mixing, diffusion, contact and so forth.

Temperatures used during the polymerizations should be sufficient to effect polymerization by activation of the initiator and double bonds of the monomers. They should not be too high to cause a run-away reaction and not too low to retard polymerization. In general, the temperatures may be from about 2° to 90° C. If even lower temperatures are used, it may be desirable to add an inert anti-freeze material to the polymerization media. Water is used in an amount sufficient to obtain the desired degree of suspension or dispersion, cooling, mixing, solids content and so forth.

Polymerization of the monomers is effected by free-radical initiators (free-radical formers or free-radical forming systems, catalysts) such as ammonium, potassium or sodium persulfate (potassium persulfate preferred for emulsion polymerization), $H_2O_2$, cumene hydroperoxide, dibenzoyl peroxide, diacetyl peroxide, didecanoyl peroxide, di-t-butyl peroxide, dilauroyl peroxide (preferred for suspension polymerization), bis(p-methoxy benzoyl)peroxide, t-butyl peroxy pivalate, dicumyl peroxide, isopropyl percarbonate, di-sec-butyl peroxydicarbonate, azobisdimethyl-valeronitrile, 2,2'-azobisisobutyronitrile, 2,2'-azobis-2-methylbutyronitrile and 2,2'-azobis(methylisobutyrate) and the like and mixtures of the same. Only minor amounts of initiators are used sufficient to effect polymerization.

Protective colloids having little surface activity are desirably used in the graft suspension polymerization process to provide finely divided particles suspended in the aqueous medium. Examples of useful protective colloids are copolymers of from 30 to 50% vinyl acetate, the balance being 1-vinyl-2-pyrrolidone. Other polymers can be used as a colloid such as those obtained by copolymerizing a pyrrolidone, such as a 1-vinyl-3-pyrrolidone, or vinyl piperidone, with a copolymerizable monomer like vinyl acetate, acrylic acid, methacrylic acid, butyl acrylate, ethyl acrylate, methyl acrylate, ethyl vinyl ketone, allyl acetone, methyl(5-hexene-2-one)vinyl ether, vinyl isobutyl ether, allyl alcohol, 3-buten-1-ol, and the like and mixtures thereof. Still other protective colloids may be used, for example, gelatin, polyacrylamide, hydroxy ethyl cellulose, hydroxy propyl methyl cellulose (preferred), carboxy methyl cellulose, methyl cellulose, gum arabic, gum tragacanth, low molecular weight polyvinyl alcohols etc. These protective colloids are used in amounts of from about 0.01 to 1.5% by weight, and preferably from about 0.1 to 0.5% by weight, based on the weight of the graft copolymer obtained.

Emulsifiers, surfactants or dispersants should be used during the emulsion polymerization process to provide the desired emulsification of the monomers to make the terpolymer per se. Anionic dispersants are preferred. Such materials are well known.

In free radical polymerization reactions, it is often desirable to control the molecular weight and/or amount of crosslinking of the resultant polymers. Polymers become difficult to process if the molecular weight is too high. In the case of polymers that are to be milled or calendered, it becomes difficult to fuse the polymers and the polymers do not form a fluid bank on the mill rolls. Sheets calendered from such polymers are generally unusable since they have a rough surface (nerve.)

Typically, regulators or chain transfer agents are added to free radical polymerization reactions to control gel formation and regulate the molecular weight. Typical chain transfer agents are halogenated hydrocarbons and organic sulfur compounds (mercaptans). These agents, when used in the appropriate amounts, can depress the molecular weight to almost any desired level. In this fashion, it becomes possible to produce polymers with a molecular weight suitable for processing.

In particular, compositions prepared by polymerizing butyl acrylate, acrylonitrile and tetrahydrofurfuryl acrylate in an aqueous suspension of poly(vinyl chloride) tend to contain gel and exhibit poor processing unless a chain transfer agent, such as dodecyl mercaptan, is added to the polymerization recipes to control gel formation and/or reduce molecular weight. It has been found, however, that lowering the molecular weight of the products in this way is accompanied by a loss in strength properties of the milled sheets.

It is an additional feature of this invention that easier processing graft poly(vinyl chloride)/acrylate compositions can be obtained even in these cases without the inclusion of the usual chain transfer agents. It has been found that compositions that can be milled into smooth, usable sheets are obtained when small amounts of methacrylonitrile are included with the other acrylate monomers that are polymerized in an aqueous graft suspension of poly(vinyl chloride). In particular, it has been found that this method is effective for poly(vinyl chloride) compositions containing butyl acrylate and acrylonitrile with tetrahydrofurfuryl acrylate. Levels of methacrylonitrile as low as 0.25%, based upon the total composition, are effective in eliminating gel and providing easier processing materials. This technique has the advantage over the use of chain transfer agents that there is no loss in strength properties of the resultant films. Furthermore, there are no undesirable odor or disposal problems that are associated with the use of halogenated hydrocarbons or mercaptans. Several examples describing the effects of chain transfer agents and methacrylonitrile on processing behavior are described herein.

The graft polymer may contain all graft copolymer but also may contain a mixture of homopolymers, copolymers and terpolymers as well, depending on the rate of polymerization of the monomers under the polymerization conditions and so forth and the degree to which an active site is generated on the vinyl chloride polymer backbone. Likewise, the terpolymer itself may contain some homopolymer or copolymer. Conversion of monomers to polymer of up to 100% may be obtained.

Prior to initiating suspension graft copolymerization, the PVC particles should be swollen with the monomers by permitting the monomers to contact the PVC particles in the aqueous media containing the initiator and preferably also the colloid for at least ½ hour, and preferably longer, at low or ambient temperatures, about 25° C., e.g., below the polymerization temperature, also, preferably with agitation or stirring. The swelling of the PVC particles or penetration of the PVC particles at any level by the polymerizable monomers provides a very intimate blend or mixture (e.g., graft, homo- and/or co-polymer(s)) on graft copolymerization. If porous PVC particles are used, absorption of the monomers by the PVC or swelling of the PVC by the monomers is faster. Also, the use of a lower level by weight of A, such as n-butyl acrylate, permits granular graft products to be obtained.

Other materials which may be used during the polymerizations are chelating or sequestering agents, stabilizers, antioxidants and shortstops (to stop the polymerization at the desired conversion and prevent further polymerization during stripping, work-up and so forth). Additional swelling agents for the vinyl chloride polymer, also, may be used to facilitate the graft polymerization or copolymerization process.

The graft vinyl chloride polymers or the vinyl chloride polymer blends of the present invention can be mixed with the usual compounding ingredients such as color pigments, biocides, flame retardants, foaming agents, mold release agents, UV stabilizers, antioxidants, antidegradants, additional plasticizers and so forth.

The following examples will serve to illustrate the present invention with more particularity to those skilled in the art. Parts are parts by weight unless otherwise noted.

EXAMPLE 1

A mixture of n-butyl acrylate (45 grams), methacrylonitrile (6.0 grams), tetrahydrofurfuryl acrylate (4 grams) and "ALPEROX" F (1 gram) (dilauroyl peroxide, 98%, Pennwalt, Lucidol Chem. Div.) was prepared. This mixture was added to a quart polymerization bottle which contained 45 grams of finely divided PVC (polyvinyl chloride), water (400 grams) and "METHOCEL" J 75 HS (0.5 g) (hydroxy propylmethyl cellulose, Dow Chemical Co.). The bottle was capped and placed in a 60° C. polymerization bath for suspension polymerization. The bottle and its contents were rotated in the bath at 60° C. for 18 hours. The bottle was removed and its contents were poured onto a filter. The filtered product was washed with water and dried. A 98% yield of product was obtained which consisted of small white particles.

Using this same generalized procedure, other graft copolymers were made of various monomers. These compositions are described in Table 1, below.

TABLE 1

COMPOSITIONS PREPARED BY GRAFTING TO PVC
(parts by weight in grams)

| Run No. | PVC | n-Butyl Acrylate | Methacrylonitrile | Acrylonitrile | Tetrahydrofurfuryl Acrylate | Tetrahydrofurfuryl Methacrylate |
|---|---|---|---|---|---|---|
| 1 | 50(a) | 50 | | | | |
| 2 | 47.5(b) | 47.5 | 5 | | | |
| 3 | 47.5(c) | 47.5 | 5 | | | |
| 4 | 45(b) | 45 | | | 10 | |
| 5 | 45(b) | 45 | 6 | | 4 | |
| 6 | 45(b) | 45 | 4 | | 6 | |
| 7 | 40(b) | 45 | 6 | | 9 | |
| 8 | 47.5(b) | 35.5 | 5 | | 12 | |
| 9 | 45(b)(2) | 45 | | 4 | 6 | |
| 10 | 45(b)(2) | 45 | | 6 | 4 | |
| 11 | 45(d)(2) | 48 | | 6 | 1 | |
| 12 | 45(d)(1) | 45 | 5 | | | 5 |
| 13 | 45(d)(1) | 45 | | | 5 | 5 |

(1) Graft copolymerization charge, also, contained 0.05 gram of t-dodecyl mercaptan ("Sulfole" 120, Phillips Petroleum Co.) per 55 grams of monomers.

The above grafted products were mixed with a typical poly(vinyl chloride) stabilizer (a powder, a high content of barium-cadmium stabilizer, MARK 686, Argus Chemical Corp.) using a Brabender Plasti-Corder at 150° C. Compression molded tensile sheets were prepared at 150° C. from the various compositions. The physical properties of each composition are listed in Table 2, below.

(2) Products made in Runs 9, 10 and 11 were all found to contain gel (they could not be totally dissolved in tetrahydrofuran) since no mercaptan was used during polymerization. Consequently, the products exhibited poor processing behavior on a two-roll mill, and only sheets with a rough surface were obtained. Nevertheless, compression molded tensile sheets could be prepared as described above which were satisfactory for obtaining physical property data.

TABLE 2

PHYSICAL PROPERTIES OF COMPOSITIONS LISTED IN TABLE 1

| Graft Polymer of Run No. | 100% Modulus MPa | Tensile Strength MPa | Elongation % | Graves Tear Strength KN/m | Short "A" Durometer Hardness(4) |
|---|---|---|---|---|---|
| 1 | Very Heterogenous | Too Weak to Test | | | |
| 2 | 4.2 | 3.8 | 160 | 27 | 89 |
| 3 | 7.5 | 10.5 | 235 | 49 | 91 |
| 4 | Very Heterogenous | Too Weak to Test | | | |
| 5 | 7.0 | 10.4 | 280 | 45 | 83 |
| 6(3) | 5.3 | 8.1 | 270 | 38 | 83 |

TABLE 2-continued

PHYSICAL PROPERTIES OF COMPOSITIONS LISTED IN TABLE 1

| Graft Polymer of Run No. | 100% Modulus MPa | Tensile Strength MPa | Elongation % | Graves Tear Strength KN/m | Short "A" Durometer Hardness(4) |
|---|---|---|---|---|---|
| 7 | 4.1 | 8.6 | 330 | 37 | 74 |
| 8 | 12.1 | 14.7 | 275 | 84 | 96 |
| 9 | 4.9 | 7.2 | 303 | 35 | 81 |
| 10 | 5.7 | 8.8 | 320 | 41 | 83 |
| 11 | 6.5 | 9.5 | 295 | 35 | 81 |
| 12 | 9.20 | 11.0 | 205 | 63.4 | 95 |
| 13 | 8.38 | 10.3 | 240 | 45.3 | 88 |

(3) A repeat of this run gave a sheet which passed the Masland Impact test at −28.9° C. On the other hand a graft of a dehydrochlorinated homopolyvinyl chloride (47.5 parts by weight dehydrochlorinated PVC, 47.5 parts butyl acrylate and 5 parts methacrylonitrile) gave a Masland Impact test result of −7° C.

MPa—Megapascals
KN/m—Kilonewtons per meter.
(4) Shore "A" is used to measure soft materials.

EXAMPLE 2

A mixture of n-butyl acrylate (82 grams), methacrylonitrile (9 grams) and tetrahydrofurfuryl acrylate (9 grams) was added to a quart polymerization bottle containing deionized water (400 grams), "AEROSOL" A-102 (4 grams) (disodium ethoxylated alcohol half ester of sulfosuccinic acid, a liquid anionic dispersant, American Cyanamid Co.) and potassium persulfate (0.4 gram). The bottle was capped and placed in a 60° C. polymerization bath. The bottle and its contents were rotated in the bath at 60° C. for 18 hours of emulsion polymerization. The bottle was removed and its contents (uniform white latex) were poured into a 2 liter beaker. The latex was coagulated by addition of 100 ml of 1.0N HCl. The coagulated crumb was recovered by filtration, washed with water and dried. Using the same generalized procedure, other co(ter)polymer compositions were prepared. The monomer ratios used are listed in Table 3, below.

TABLE 3

TERPOLYMER COMPOSITIONS PREPARED BY EMULSION POLYMERIZATION FOR BLENDING WITH PVC
(parts by weight in grams)

| Run No. | n-Butyl Acrylate | Methacrylonitrile | Tetrahydrofurfuryl Acrylate |
|---|---|---|---|
| 20 | 82 | 9 | 9 |
| 21 | 82 | 7 | 11 |
| 22 | 75 | 7 | 18 |
| 23 | 75 | 10 | 15 |

The resulting terpolymers were rubbery.

Homopolyvinyl chloride (b) (63 grams) was mixed with the same poly(vinyl chloride) stabilizer of Example 1, above, and fused on a two-roll mill at 165° C. To the molten PVC was added one of the above terpolymer rubbers (70 grams). Parts by weight ratio of PVC to the rubber was 47.4 to 52.6. The poly(vinyl chloride) and terpolymer rubber were mixed well for 10 minutes at 165° C. A sheet of the blend was removed from the mill. This sheet was uniform and translucent. A compression molded tensile sheet was prepared from 65 grams of this composition. Using this same generalized procedure, blends with PVC in the same ratios were made from each of the terpolymer compositions listed in Table 3. The physical properties of these blends are given in Table 4, below.

TABLE 4
PHYSICAL PROPERTIES OF TERPOLYMER BLENDS WITH PVC

| Run No. | Ter Polymer From Run No. | 100% Modulus MPa | Tensile Strength MPa | Elongation % | Graves Tear Strength KN/m | Shore "A" Hardness |
|---|---|---|---|---|---|---|
| 20-1 | 20 | 6.8 | 11.2 | 260 | 30 | 79 |
| 21-1 | 21 | 6.5 | 9.3 | 256 | 25 | 73 |
| 22-1 | 22 | 7.4 | 12.2 | 305 | 40 | 83 |
| 23-1 | 23 | 10.9 | 14.6 | 280 | 61 | 93 |

Additional examples as set forth below illustrate techniques used to prepare graft PVC copolymers using aqueous suspension free radical polymerizations according to the present invention. For instance, typically in these examples, PVC(b) (40 grams), water (400 grams) and METHOCEL F-5C (5 ml, 0.5% aqueous solution, hydroxy propyl methyl cellulose, Dow Chemical Co.) were charged to a quart polymerization bottle. A solution of n-butyl acrylate (40 grams), methyl acrylate (20 grams) and ALPEROX F (2.0 grams) was added. The bottle was capped and allowed to stand at ambient temperature for 4.5 hours with occasional shaking to allow the monomers to be absorbed into the PVC particles. The bottle was placed in a polymerizer bath at 60° C. for 18 hours. The bottle and its contents were allowed to cool to room temperature. The contents of the bottle were filtered to recover the product (white, loose particles). The product was washed with 200 ml of water and dried in an air circulating oven at 55° C. for 18 hours. The yield was 100 grams (100%) and the product was totally soluble in tetrahydrofuran. Variations were made in the type and amounts of monomers used. In some cases, a chain transfer agent was used in the polymerization. All variations are listed in the following tables. All of the products were mixed with 1.0 phr (parts by weight per 100 parts by weight of rubber or polymer) of a typical PVC stabilizer (a powder, a high content of a barium-cadmium stabilizer, MARK 686, Argus Chem. Corp.) using a Brabender Plasti-Corder at 150° C. Compression molded tensile sheets were prepared at 150° C. from all of the compositions. The physical properties of each composition, also, are listed in the tables.

EXAMPLE 3

The compositions in Tables 5 and 6, below, are listed for comparative purposes. These materials contain poly(vinyl chloride) grafted with a butyl acrylate and some of the individual monomers described in this application. All of these materials (Table 6) were weak and heterogeneous or were otherwise unsatisfactory.

TABLE 5
POLY(VINYL CHLORIDE) COMPOSITIONS CONTAINING TWO OF THE THREE CLASSES OF MONOMERS
% is by weight

| Run No. | % PVC | % n-Butyl Acrylate | % Methacrylonitrile | % Acrylonitrile | % Tetrahydrofurfuryl Acrylate | % Ethyl Acrylate | % Methyl Acrylate |
|---|---|---|---|---|---|---|---|
| 30 | 50(a) | 50 | — | — | — | — | — |
| 31 | 47.5(b) | 47.5 | 5 | — | — | — | — |
| 32* | 47.5(d) | 47.5 | — | 5 | — | — | — |
| 33* | 45(b) | 45 | — | — | 10 | — | — |
| 34 | 45(d) | 45 | — | — | — | 10 | — |
| 35 | 40(b) | 40 | — | — | — | — | 20 |

*Monomers were polymerized in the presence of .06 part of t-dodecyl mercaptan.

TABLE 6
PROPERTIES OF COMPOSITIONS IN TABLE 5

| Run No. | 100% Modulus MPa | Tensile MPa | Elongation % | Graves Tear Strength kN/m | Shore "A" |
|---|---|---|---|---|---|
| 30 | Very heterogeneous, too weak to test. | | | | |
| 31 | 4.2 | 3.8 | 160 | 27 | 89 |
| 32 | 7.6 | 7.9 | 175 | 27 | 61 |
| 33 | Very heterogeneous, too weak to test. | | | | |
| 34 | Very heterogeneous, too weak to test. | | | | |
| 35 | 4.5 | 8.5 | 305 | 29 | 75 |

EXAMPLE 4

In Tables 7 and 8, below, are listed compositions containing various levels of graft poly(vinyl chloride) with n-butyl acrylate, methyl acrylate and arylonitrile. The ratio of monomers was approximately the same in each case. Materials containing less than 40% poly(vinyl chloride) were soft and weak. Materials containing 40% or more poly(vinyl chloride) were more uniform and stronger than similar materials described in Example 3.

TABLE 7
PVC/BUTYL ACRYLATE/METHYL ACRYLATE/ACRYLONITRILE COMPOSITIONS WITH VARIOUS AMOUNTS OF MATERIALS % is by weight

| Run No. | % PVC | % n-Butyl Acrylate | % Methyl Acrylate | % Acrylonitrile |
|---|---|---|---|---|
| 40 | 10(b) | 68 | 15 | 7 |
| 41 | 20(b) | 60 | 13.6 | 6.4 |
| 42 | 30(b) | 52 | 12 | 6 |
| 43 | 40(b) | 45 | 10 | 5 |
| 44 | 45(d) | 40 | 10 | 5 |

TABLE 8
PROPERTIES OF GRAFT COPOLYMER COMPOSITIONS IN TABLE 7

| Run No. | 100% Modulus MPa | Tensile MPa | Elongation % | Graves Tear Strength kN/m | Shore "A" |
|---|---|---|---|---|---|
| 40 | .39 | 2.2 | 1015 (no break) | 11 | 33 |
| 41 | 1.3 | 4.4 | 637 | 18 | 45 |
| 42 | 2.9 | 9.2 | 508 | 27 | 61 |
| 43 | 5.4 | 10.2 | 355 | 38 | 76 |
| 44 | 8.7 | 12.1 | 290 | 49 | 88 |

EXAMPLE 5

The graft copolymer compositions listed in Tables 9 and 10, below, all contain 40% poly(vinyl chloride) with varying ratios of n-butyl acrylate, methyl acrylate and acrylonitrile. All of the materials were homogeneous and had higher tensile and tear strengths as compared to the materials in Example 3.

TABLE 9
PVC/BUTYL ACRYLATE/METHYL ACRYLATE/ACRYLONITRILE GRAFT COMPOSITIONS WITH VARYING LEVELS OF MONOMERS % is by weight

| Run No. | % PVC | % n-Butyl Acrylate | % Methyl Acrylate | % Acrylonitrile |
|---|---|---|---|---|
| 50 | 40(b) | 45 | 10 | 5 |
| 51 | 40(b) | 40 | 15 | 5 |
| 52 | 40(b) | 35 | 20 | 5 |
| 53 | 40(b) | 30 | 25 | 5 |
| 54 | 40(b) | 40 | 17 | 3 |
| 55 | 40(b) | 40 | 19 | 1 |

TABLE 10
PROPERTIES OF GRAFT COPOLYMER COMPOSITIONS IN TABLE 9

| Run No. | 100% Modulus MPa | Tensile MPa | Elongation % | Graves Tear Strength kN/m | Shore "A" |
|---|---|---|---|---|---|
| 50 | 5.6 | 10.2 | 384 | 38 | 78 |
| 51 | 6.6 | 11.5 | 377 | 43 | 80 |
| 52 | 8.0 | 12.4 | 341 | 53 | 87 |
| 53 | 8.9 | 13.3 | 355 | 63 | 90 |
| 54 | 6.3 | 11.0 | 366 | 41 | 78 |
| 55 | 5.7 | 9.3 | 324 | 35 | 72 |

EXAMPLE 6

In Tables 11 and 12, below, are materials prepared by graft copolymerizing n-butyl acrylate, ethyl acrylate and acrylonitrile with PVC. All of the materials were homogeneous with good properties.

TABLE 11
PVC/BUTYL ACRYLATE/ETHYL ACRYLATE/ACRYLONITRILE GRAFT COPOLYMER COMPOSITIONS
% is by weight

| Run No. | % PVC | % n-Butyl Acrylate | % Ethyl Acrylate | % Acrylonitrile |
|---|---|---|---|---|
| 60 | 45(d) | 35 | 15 | 5 |
| 61 | 45(d) | 30 | 20 | 5 |
| 62 | 45(d) | 20 | 30 | 5 |
| 63 | 45(e) | 30 | 20 | 5 |

TABLE 12
PROPERTIES OF GRAFT COPOLYMER COMPOSITIONS IN TABLE 11

| Run No. | 100% Modulus MPa | Tensile MPa | Elongation % | Graves Tear Strength kN/m | Shore "A" |
|---|---|---|---|---|---|
| 60 | 8.7 | 12.5 | 285 | 47 | 86 |
| 61 | 8.5 | 12.2 | 285 | 44 | 89 |
| 62 | 8.7 | 12.7 | 275 | 48 | 89 |
| 63 | 8.7 | 12.7 | 285 | 53 | 89 |

EXAMPLE 7

In Tables 13 and 14, below, are materials prepared by graft copolymerizing mixtures of n-butyl acrylate, methyl acrylate and N-vinyl-2-pyrrolidone with PVC.

TABLE 13
PVC/BUTYL ACRYLATE/METHYL ACRYLATE/N—VINYL-2-PYRROLIDONE GRAFT COPOLYMER COMPOSITIONS

| Run No. | % PVC | % n-Butyl Acrylate | % Methyl Acrylate | % N—Vinyl-2-Pyrrolidone |
|---|---|---|---|---|
| 70 | 40(e) | 40 | 15 | 5 |
| 71 | 40(e) | 37 | 20 | 3 |
| 72 | 40(e) | 39 | 19 | 2 |

TABLE 14
PROPERTIES OF COMPOSITIONS IN TABLE 13

| Run No. | 100% Modulus MPa | Tensile MPa | Elongation % | Graves Tear Strength kN/m | Shore "A" |
|---|---|---|---|---|---|
| 70 | 6.7 | 8.8 | 265 | 47 | 84 |
| 71 | 6.1 | 8.1 | 280 | 41 | 84 |
| 72 | 4.9 | 6.3 | 245 | 35 | 80 |

EXAMPLE 8

Graft copolymers of similar composition (pbw) were prepared from 45 gm PVC (d), 45 gm n-butyl acrylate, 5 gm tetrahydrofurfuryl acrylate and 5 gm acrylonitrile. The products were prepared using the exact same procedure as shown above except that various levels of t-dodecyl mercaptan (chain transfer agent) were included with the monomers and catalyst during polymerization. The solubility of the materials in tetrahydrofuran and properties are listed in Table 15, below. Products made with less than 0.050 ml of t-dodecyl mercaptan contained gel. The strength of the materials (tensile and tear) was reduced as increasing levels of chain transfer agent were used.

TABLE 15
PVC/GRAFT COPOLYMER COMPOSITIONS PREPARED WITH CHAIN TRANSFER AGENT

| Run No. | BA gm | AN gm | THFA gm | DDM ml | Solubility in THF | 100% Modulus MPa | Tensile MPa | Elongation % | Graves Tear Strength kN/m | Shore "A" |
|---|---|---|---|---|---|---|---|---|---|---|
| 80 | 45 | 5 | 5 | 0 | Partial (gel) | 8.9 | 11.8 | 245 | 47 | 82 |
| 81 | 45 | 5 | 5 | .025 | Partial (gel) | — | — | — | — | — |
| 82 | 45 | 5 | 5 | .050 | Soluble | 7.7 | 10.7 | 285 | 42 | 85 |
| 83 | 45 | 5 | 5 | 0.10 | Soluble | 7.6 | 9.6 | 260 | 43 | 86 |
| 84 | 45 | 5 | 5 | 0.15 | Soluble | 6.5 | 7.2 | 200 | 36 | 85 |
| 85 | 45 | 5 | 5 | 0.20 | Soluble | 5.6 | 5.7 | 210 | 31 | 85 |

Monomers were reacted in the presence of 45 grams of PVC(d) in each run.

BA (n-Butyl Acrylate), AN (Acrylonitrile), THFA (Tetrahydrofurfuryl Acrylate) and DDM (t-Dodecyl Mercaptan).

EXAMPLE 9

Graft copolymers of the similar composition as described in Example 8 were prepared with no chain transfer agent and various ratios of acrylonitrile and methacrylonitrile. The compositions and their gel content (solubility in tetrahydrofuran) are listed in Table 16, below. When ratios of methacrylonitrile/acrylonitrile greater than 0.5/4.5 were used, the products contained no gel. Properties of the materials are listed in Table 17, below. All of the materials had good strength (there was no loss in properties as was the case in Example 8 where a chain transfer agent was used to control gel).

TABLE 16

POLY(VINYL CHLORIDE) GRAFT COPOLYMER PREPARED WITH VARYING LEVELS OF MONOMERS

| Run No. | BA gm | AN gm | MAN gm | THFA gm | Solubility in THF |
|---|---|---|---|---|---|
| 90 | 45 | 5.0 | X | 5 | Partial (gel) |
| 91 | 45 | 4.9 | 0.10 | 5 | Partial (gel) |
| 92 | 45 | 4.75 | 0.25 | 5 | Partial (gel) |
| 93 | 45 | 4.5 | 0.5 | 5 | Soluble |
| 94 | 45 | 4.0 | 1.0 | 5 | Soluble |
| 95 | 45 | 3.0 | 2.0 | 5 | Soluble |
| 96 | 45 | 2.0 | 3.0 | 5 | Soluble |
| 97 | 45 | 1.0 | 4.0 | 5 | Soluble |
| 98 | 45 | X | 5.0 | 5 | Soluble |

Monomers were reacted in the presence of 45 grams of PVC(d) in each run.

BA (n-Butyl Acrylate), AN (Acrylonitrile), MAN (Methacrylonitrile), THFA (Tetrahydrofurfuryl Acrylate).

TABLE 17

PROPERTIES OF COMPOSITIONS IN TABLE 16

| Run No. | 100% Modulus MPa | Tensile MPa | Elongation % | Graves Tear Strength kN/m | Shore "A" |
|---|---|---|---|---|---|
| 90 | 9.7 | 12.3 | 225 | 46 | 84 |
| 91 | 9.1 | 12.8 | 260 | 47 | 86 |
| 92 | 9.1 | 12.4 | 251 | 48 | 86 |
| 93 | 8.8 | 11.2 | 190 | 46 | 85 |
| 94 | 9.1 | 12.5 | 283 | 50 | 88 |
| 95 | 8.6 | 12.3 | 290 | 52 | 90 |
| 96 | 8.6 | 12.3 | 275 | 54 | 90 |
| 97 | 8.4 | 12.3 | 280 | 57 | 92 |
| 98 | 8.6 | 12.1 | 260 | 57 | 93 |

In the following Examples (10, 11 and 12) graft suspension PVC copolymers were prepared as described in the previous Examples except that 3 batches of each graft copolymer were prepared and blended to have sufficient material for mill processing studies.

EXAMPLE 10

A suspension graft copolymer was prepared from PVC(b) (45% by weight), n-butyl acrylate (45% by weight), acrylonitrile (4% by weight) and tetrahydrofurfuryl acrylate (6% by weight). No chain transfer agent was used in the preparation. The product obtained (100% conversion) was partially soluble in tetrahydrofuran. The product was fluxed on a two-roll mill with 1.0 phr MARK 686 at 132°–138° C. A film (0.035" thick) was removed from the mill which was dark yellow in color and had a very rough surface. Properties of this sheet are listed in Tables 18 and 19, below.

EXAMPLE 11

A suspension graft copolymer was prepared from PVC(b) (45% by weight), n-butyl acrylate (45% by weight), acrylonitrile (5% by weight) and tetrahydrofurfuryl acrylate (5% by weight). t-Dodecyl mercaptan (0.5 ml) was included with the monomers during polymerization. The product obtained was soluble in tetrahydrofuran (100% conversion). The material was fluxed on a two-roll mill with 1.0 phr MARK 686 at 132°–138° C. A film (0.035" thick) was removed from the mill which was off-white in color and had a very smooth surface. Properties of this film are listed in Tables 18 and 19, below.

EXAMPLE 12

A suspension graft copolymer was prepared from PVC(b) (45% by weight), n-butyl acrylate (45% by weight), methacrylonitrile (4% by weight) and tetrahydrofurfuryl acrylate (6% by weight). No chain transfer agent was used in the preparation. The product obtained (100% conversion) was soluble in tetrahydrofuran. Milled sheets (132°–138° C.) with 1.0 phr MARK 686 were white and very smooth. Properties are listed in Tables 18 and 19, below.

TABLE 18

GRAFT PVC COMPOSITIONS PREPARED FOR MILL PROCESSING

| Product of Example No. | % PVC | % BA | % AN | % MAN | % THFA | DDM ml | Solubility in THF |
|---|---|---|---|---|---|---|---|
| 10 | 45 | 45 | 4 | — | 6 | — | Partial (gel) |
| 11 | 45 | 45 | 5 | — | 5 | .05 | Soluble |
| 12 | 45 | 45 | — | 4 | 6 | — | Soluble |

BA (n-Butyl Acrylate),
AN (Acrylonitrile),
MAN (methacrylonitrile),
THFA (Tetrahydrofurfuryl Acrylate),
DDM (t-Dodecyl Mercaptan).

TABLE 19

PROPERTIES OF COMPOSITIONS OF TABLE 18 (MILLED SHEETS)

| Example No. | Mill Roll Temperature °C. | 100% Modulus MPa | Tensile MPa | Elongation % | Graves Tear Strength kN/m | Shore "A" | Milled Sheet Appearance |
|---|---|---|---|---|---|---|---|
| 10 | 132–138 | 5.8 | 10.4 | 335 | 40 | 80 | Rough, Yellowed |
| 11 | 132–138 | 5.8 | 5.9 | — | 27 | 87 | Very Smooth, Off-White |

TABLE 19-continued
PROPERTIES OF COMPOSITIONS OF TABLE 18 (MILLED SHEETS)

| Example No. | Mill Roll Temperature °C. | 100% Modulus MPa | Tensile MPa | Elongation % | Graves Tear Strength kN/m | Shore "A" | Milled Sheet Appearance |
|---|---|---|---|---|---|---|---|
| 12 | 132–138 | 5.6 | 8.5 | 260 | 40 | 84 | Very Smooth, White |

Notes for Examples:
(a) Homopolyvinyl chloride, porous, inherent viscosity of 0.66 in cyclohexanone at 30° C.
(b) Homopolyvinyl chloride, porous, inherent viscosity of 0.77 in cyclohexanone at 30° C.
(c) Dehydrochlorinated homopolyvinyl chloride made by dehydrochlorinating (b).
(d) Homopolyvinyl chloride, porous, inherent viscosity of 0.96 in cyclohexanone at 30° C.
(e) Homopolyvinyl chloride, porous, inherent viscosity of 0.77 in cyclohexanone at 30° C., made by a method different from that of PVC (b).
Homopolyvinyl chlorides (a), (b), (c), (d) and (e) had no appreciable elongations; all were made by aqueous free radical suspension polymerization.

We claim:

1. The method which comprises aqueous free radical emulsion copolymerizing polymerizable monomers A, B and C to form a terpolymer in which the relative ratios of A, B and C to each other on a percent by weight basis are from about 24 to 94 of A, from about 1 to 75 of B and from about 1 to 20 of C, the total of A, B and C being 100, said emulsion optionally additionally containing a chain transfer agent in a minor amount sufficient to avoid formation of gel, where A has the formula $$CH_2=C(H)-C(=O)-O-R$$

where R is an alkyl group of from 4 to 8 carbon atoms and mixtures of A, said A as a homopolymer having a Tg not above $-20°$ C., where B is selected from the group consisting of tetrahydrofurfuryl acrylate and tetrahydrofurfuryl methacrylate and mixtures of the same and where C is selected from the group consisting of acrylonitrile, methacrylonitrile, N-vinyl-2-pyrrolidone and vinyl-alpha-methyl pyrrolidone and mixtures of the same.

2. The method according to claim 1 where said A is n-butyl acrylate, B is tetrahydrofurfuryl acrylate and C is methacrylonitrile.

3. The method according to claim 1 where said A is n-butyl acrylate, B is tetrahydrofurfuryl acrylate and C is acrylonitrile.

4. The method according to claim 1 where said A is n-butyl acrylate, B is tetrahydrofurfuryl methacrylate and C is methacrylonitrile.

5. The method according to claim 1 where said A is n-butyl acrylate, B is tetrahydrofurfuryl acrylate and C is a mixture of acrylonitrile and methacrylonitrile.

6. The method according to claim 1 where said A is n-butyl acrylate, B is tetrahydrofurfuryl methacrylate and C is acrylonitrile.

7. A rubbery emulsion terpolymer consisting essentially of A, B and C where the relative ratios of A, B and C to each other on a percent by weight basis are from about 24 to 94 of A, from about 1 to 75 of B and from about 1 to 20 of C, the total of A, B and C being 100, where A has the formula $$CH_2=C(H)-C(=O)-O-R$$

where R is an alkyl group of from 4 to 8 carbon atoms and mixtures of A, said A as a homopolymer having a Tg not above $-20°$ C., where B is selected from the group consisting of tetrahydrofurfuryl acrylate and tetrahydrofurfuryl methacrylate and mixtures of the same and where C is selected from the group consisting of acrylonitrile, methacrylonitrile, N-vinyl-2-pyrrolidone and vinyl-alpha-methyl pyrrolidone and mixtures of the same.

8. A terpolymer according to claim 7 where said A is n-butyl acrylate, B is tetrahydrofurfuryl acrylate and C is methacrylonitrile.

9. A terpolymer according to claim 7 where said A is n-butyl acrylate, B is tetrahydrofurfuryl acrylate and C is acrylonitrile.

10. A terpolymer according to claim 7 where said A is n-butyl acrylate, B is tetrahydrofurfuryl methacrylate and C is methacrylonitrile.

11. A terpolymer according to claim 7 where said A is n-butyl acrylate, B is tetrahydrofurfuryl acrylate and C is a mixture of acrylonitrile and methacrylonitrile.

12. A terpolymer according to claim 7 where said A is n-butyl acrylate, B is tetrahydrofurfuryl methacrylate and C is acrylonitrile.

13. A terpolymer according to claim 7 blended in an amount of from 60 to 40% by weight with from about 40 to 60% by weight of a suspension polymerized vinyl chloride polymer selected from the group consisting of homopolyvinyl chloride, a copolymer of vinyl chloride and vinyl acetate containing up to about 50% by weight of vinyl acetate, and a copolymer of vinyl chloride and vinylidene chloride containing up to about 50% by weight of vinylidene chloride and mixtures of the same.

14. A terpolymer according to claim 13 where said vinyl chloride polymer is a porous homopolyvinyl chloride.

* * * * *